United States Patent
Hui et al.

(10) Patent No.: US 12,314,961 B1
(45) Date of Patent: May 27, 2025

(54) NETWORK SERVICE CENTER WITH IMPROVED VIRTUAL IMMERSION DURING SERVICE DURATIONS VIA ALTERNATIVE VIRTUAL EXPERIENCES

(71) Applicant: T-Mobile USA, Inc., Bellevue, WA (US)

(72) Inventors: Jie Hui, Mercer Island, WA (US); Joohyung Kim, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 8 days.

(21) Appl. No.: 18/516,633

(22) Filed: Nov. 21, 2023

(51) Int. Cl.
*H04W 24/02* (2009.01)
*G06Q 30/016* (2023.01)
*G06T 13/40* (2011.01)
*H04L 41/0803* (2022.01)
*H04W 8/18* (2009.01)
*H04W 12/06* (2021.01)

(52) U.S. Cl.
CPC ........ *G06Q 30/016* (2013.01); *G06T 13/40* (2013.01); *H04L 41/0803* (2013.01); *H04W 8/18* (2013.01); *H04W 24/02* (2013.01)

(58) Field of Classification Search
CPC ....... H04W 24/02; H04W 8/18; H04W 12/06; G06Q 30/016; G06T 13/40; H04L 41/0806
See application file for complete search history.

(56) References Cited

U.S. PATENT DOCUMENTS

| | | | |
|---|---|---|---|
| 6,115,693 A | 9/2000 | Mcdonough et al. | |
| 2010/0131876 A1* | 5/2010 | McGuire | A63F 13/79 715/848 |
| 2012/0011545 A1* | 1/2012 | Doets | H04N 21/8153 725/38 |
| 2015/0088671 A1* | 3/2015 | Xiong | G06Q 50/12 705/15 |
| 2020/0328908 A1* | 10/2020 | Howland | H04L 9/008 |
| 2021/0133819 A1* | 5/2021 | Adibi | G06Q 30/0257 |
| 2022/0292543 A1 | 9/2022 | Henderson | |
| 2023/0291740 A1* | 9/2023 | Ashby | H04L 63/083 |

FOREIGN PATENT DOCUMENTS

| | | |
|---|---|---|
| CN | 101573734 A | 11/2009 |
| EP | 0797338 B1 | 3/2006 |
| EP | 3731943 A1 | 11/2020 |
| JP | 2007226614 A | 9/2007 |

(Continued)

OTHER PUBLICATIONS

"Avatar Teleporter", https://docs.spatial.io/avatar-teleporter.

*Primary Examiner* — Schquita D Goodwin
*Assistant Examiner* — Joseph M Cousins
(74) *Attorney, Agent, or Firm* — Perkins Coie LLP

(57) ABSTRACT

Continuous and non-episodic user sessions in a virtual world are facilitated by providing a virtual service center with alternative virtual experiences selected to retain user presence in the virtual world. The virtual service center is associated with a mobile network operator (MNO) of a telecommunications network and is provided to enable resolution or fulfillment of network service issues indicated by users. The alternative virtual experiences are selected and users driven thereto to continuously engage users in the virtual world outside of the immediate context of their service issues and resolution thereof.

20 Claims, 12 Drawing Sheets

(56) References Cited

FOREIGN PATENT DOCUMENTS

| | | |
|---|---|---|
| KR | 100678312 B1 | 2/2007 |
| KR | 20090112049 A | 10/2009 |
| KR | 102542070 B1 | 7/2023 |
| WO | 2009102516 A1 | 8/2009 |
| WO | 2012135231 A2 | 10/2012 |

\* cited by examiner

NETWORK SERVICE CENTER WITH IMPROVED VIRTUAL IMMERSION DURING SERVICE DURATIONS VIA ALTERNATIVE VIRTUAL EXPERIENCES

BACKGROUND

Extended reality (XR) enables users to enjoy experiences and activities in virtual or simulated worlds. These virtual or simulated worlds are offered as an immersive alternative to the real-life world. Yet, some XR users utilize these virtual or simulated worlds with singular, isolated, or discrete purposes, such as to play a specific electronic game or to conduct a single interaction with another user. As such, these XR users are characterized by an episodic, sporadic, and discontinuous use of a virtual world. For instance, a user may connect or log on to the virtual world for their singular purpose and immediately disconnect from or log off the virtual world once their singular purpose is fulfilled. This presents an obstacle to complete immersion and lasting sessions with a virtual world.

BRIEF DESCRIPTION OF THE DRAWINGS

Detailed descriptions of implementations of the present invention will be described and explained through the use of the accompanying drawings.

Figure 1:
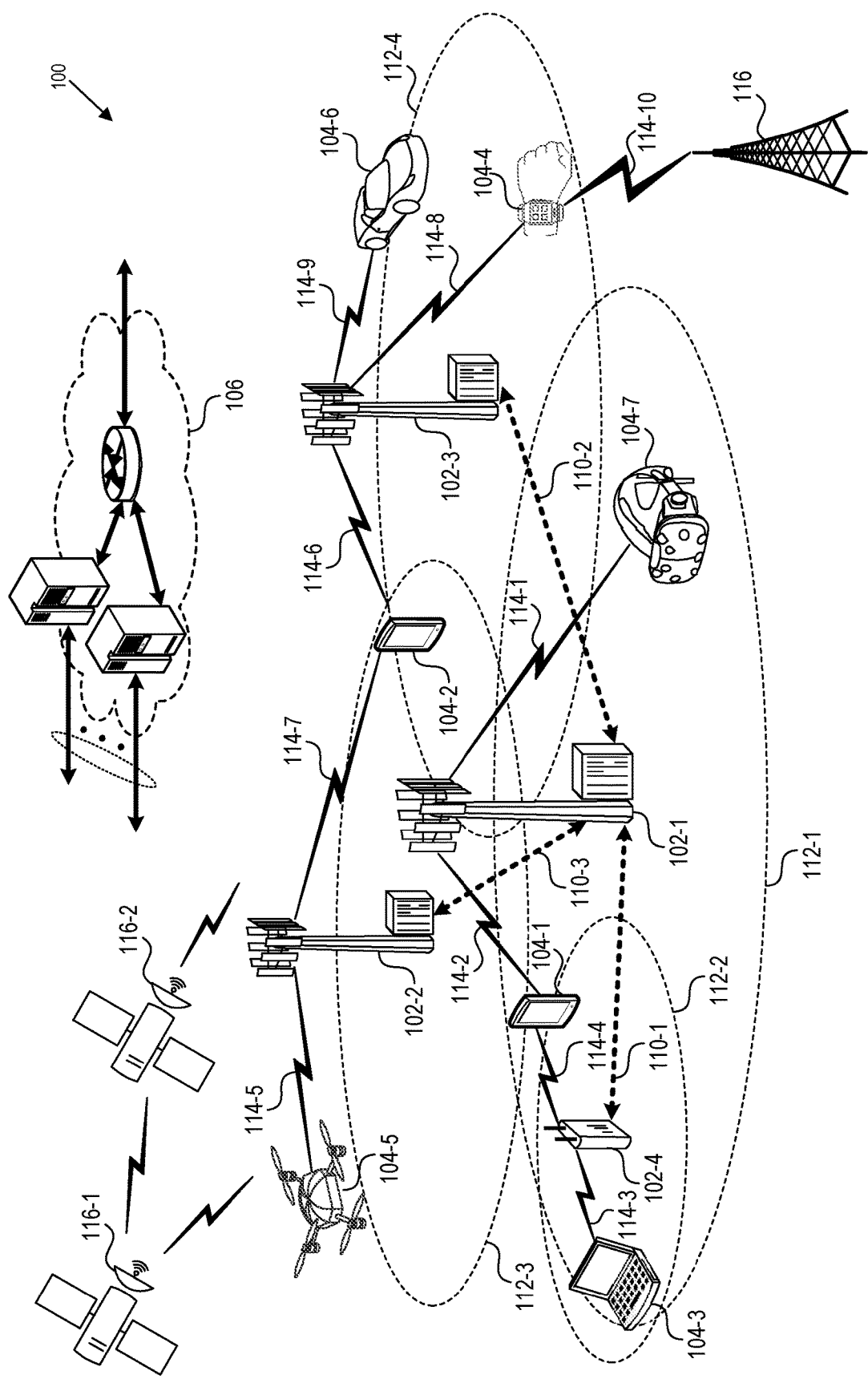
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to providing a continuous and immersive experience when virtually resolving service issues related to a telecommunications network. Example embodiments provide a virtual service center associated with a mobile network operator (MNO) of a telecommunications network, and the virtual service center facilitates resolution of service issues related to the telecommunications network. Providing a virtual service center in a virtual world or environment can induce some users to solely enter the virtual world to resolve a service issue and immediately disconnect from the virtual world when fulfilled or if delayed. Disclosed embodiments select alternative virtual experiences for users and engage users therein to thereby motivate continuous and non-episodic sessions in the virtual world. A system providing the virtual world can also implement disclosed embodiments to manage user densities in virtual spaces, for example, by diverting certain users to alternative virtual experiences separated from a main experience.

Alternative virtual experiences can include electronic games or mini-games, movies or video-form content, simulated tourism experiences, concerts or musical presentations, and/or the like. According to disclosed embodiments, a system selects certain alternative experiences for a user based on various factors, including a predicted time to resolve the user's service issue. Based on the predicted time, the system can offer alternative experiences of suitable duration to fill the predicted time. By doing so, a user can remain engaged and immersed in the virtual world in light of long waits and delays at the virtual service center. The system can alternatively or additionally select alternative experiences based on user historical activity and/or preferences, which can be stored with network subscriber information.

Additional aspects of the present disclosure relate to various technical solutions for the implementation of the virtual service center in a virtual world or environment. In some embodiments, the virtual world with the virtual service center is provided via a multi-mode platform that enables users to access the virtual world via immersive user devices (e.g., a virtual reality (VR) headset) or via non-immersive user devices (e.g., devices with a two-dimensional display medium, such as a smartphone, laptop, tablet, and/or the like). At least users accessing the virtual world via their non-immersive user devices can have authentication information for a network subscriber profile automatically provided to the virtual world, such that aspects of the virtual service center can be personalized. In some embodiments, virtual objects rendered within the virtual service center, such as representations of network devices, can be scaled in size and/or number based on a number of users concurrently accessing the virtual service center.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 ("network 100") in which aspects of the disclosed technology are incorporated. Users may connect to servers and systems via the wireless telecommunication network 100 to access virtual environments, worlds, or spaces provided by the servers and systems. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
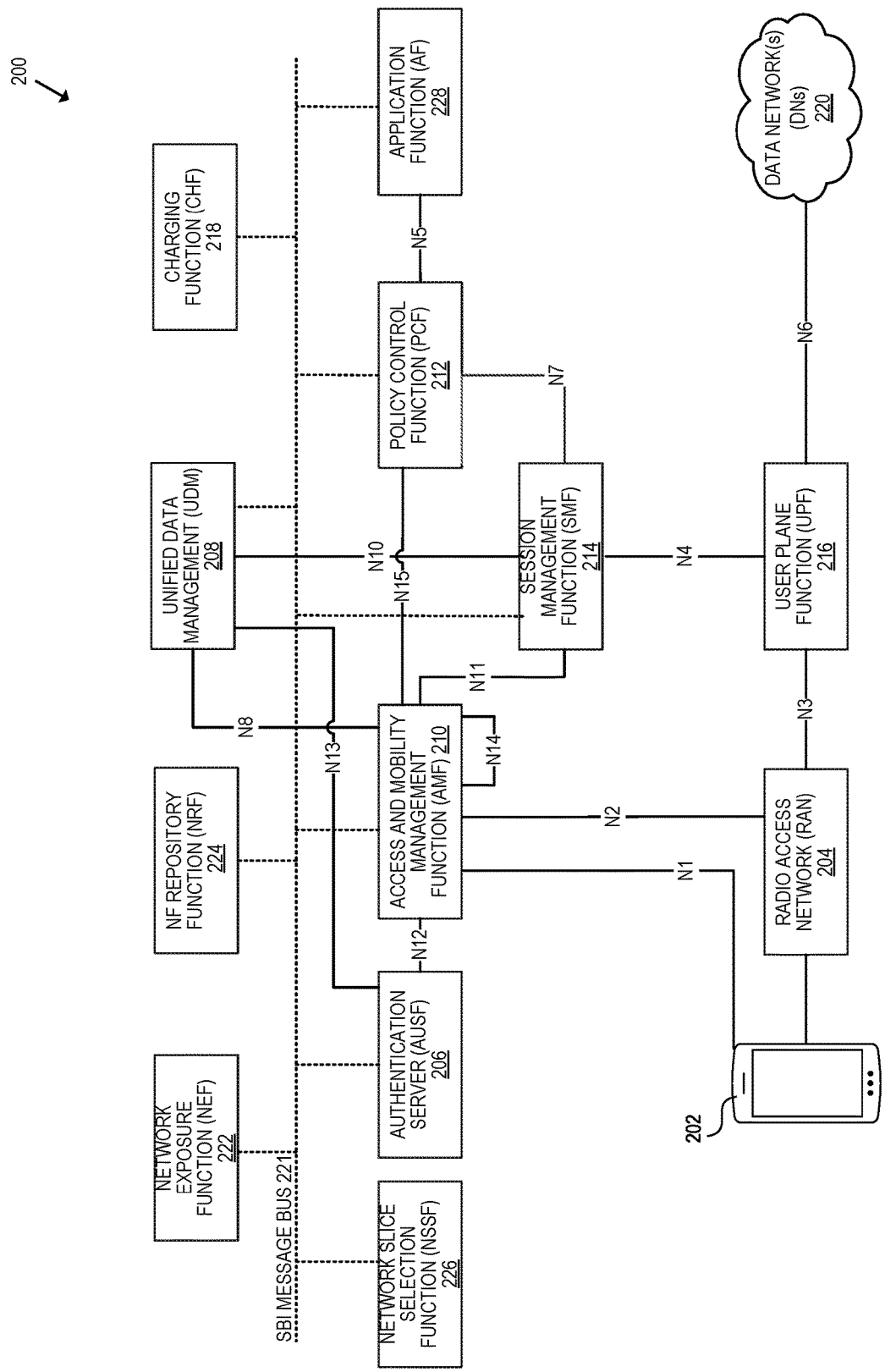
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. For example, a particular network slice can be reserved and/or optimized for users accessing a virtual world or environment. For stable maintenance and configuration of the particular network slice, it can be desirable to discourage extreme spikes and dips in user traffic on the particular network slice. In some examples, the disclosed solutions may mitigate at least in part changes in user traffic by encouraging extended and continuously-immersed sessions in a virtual world or environment.

A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Example Embodiments for Virtual Service Centers

Example embodiments of the present disclosure relate to selecting and driving virtual world users to alternative virtual experiences separate from a virtual service center associated with an MNO of a telecommunications network. Selection of specific alternative experiences motivates continuous and non-episodic sessions in a virtual world for users who may be singularly motivated by a given service issue, for example, by providing additional objective and purpose for the users' visit to the virtual world. Otherwise, a user who ventures into a virtual world because of a service issue may immediately disconnect from or exit the virtual world upon fulfillment or delay.

Figure 3:
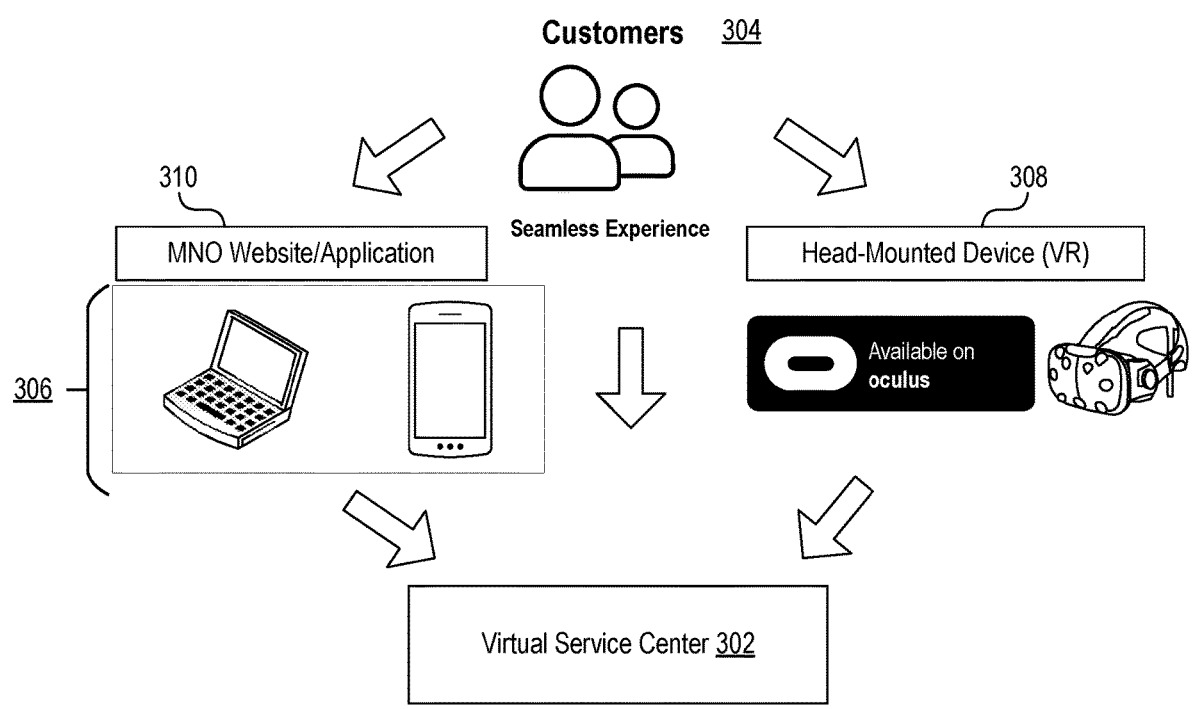
FIG. 3 depicts examples of multi-platform access to a virtual service center.

Aspects of the present disclosure enable multi-platform or multi-mode access to a virtual service center and in some embodiments, leverage the access platform or mode when providing the virtual service center. FIG. 3 illustrates a diagram of an example of multi-platform access to a virtual service center 302. The virtual service center 302 is provided by an MNO of a telecommunications network as an immersive means for network subscribers (including prospective or new subscribers) to resolve service issues and requests. The virtual service center 302 can be provided within a virtual world, for example, at a location among other virtual experiences, among which the user can virtually travel. The virtual service center 302 can be configured and operated to resolve or fulfill service issues indicated by network subscribers, and these service issues can include purchase of a new network device (e.g., a mobile phone), provisioning or setting up the new network device with the telecommunications network, troubleshooting technical issues with a network device, modifying or managing network subscriber information (e.g., mobile plan parameters or terms), resolving network area issues, facilitating immersive education (e.g., device use tutorials, service plan education), and/or the like.

As illustrated, customers 304, including virtual world users and network subscribers, can seamlessly access the virtual service center 302 inside a virtual world or environment via at least two different mediums or modes. In particular, the virtual service center 302 is configured, or is part of a virtual world or environment that is configured, to be provided at either non-immersive user devices 306 or immersive user devices 308. Immersive user devices 308 or systems include head-mounted virtual reality (VR) devices, holographic rooms or spaces, augmented reality (AR) featured wearable devices (e.g., wearable glasses), and/or the like that has the customer 304 or user having a perception of being physically present in the virtual world or virtual service center. In contrast, non-immersive user devices 306 or systems include devices having a physical display unit (e.g., a screen) on which visual content of the virtual world or virtual service center is displayed. For example, non-immersive user devices 306 or systems include smartphones, laptops, tablets, and televisions. While the visual content can be rendered on a physical display unit in a detailed and three-dimensional manner (e.g., based on three-dimensional models, using shadows and physics-based effects), the visual content is delivered to a user in a non-immersive manner. Immersive user devices 308 may be devices or systems specialized for virtual reality, augmented reality (AR), mixed reality (MR), and the like. In some embodiments, the virtual service center 302 and/or a virtual world in which the virtual service center 302 is located is supported by a platform or system that enables flexible rendering of content depending on whether a user device is immersive or non-immersive. For example, the virtual service center 302 is provided via Spatial, Horizon Worlds, AltspaceVR, or a similar platform.

At least when using a non-immersive user device, such as a laptop or a smartphone, a customer 304 can initiate access to the virtual service center 302 via a website (accessed via a web browser application) or a user application residing on the non-immersive user device. In particular, the customer 304 can initiate access via a website or user application 310 associated with the MNO operating the virtual service center (e.g., www.t-mobile.com or a T-Mobile app to access a T-Mobile virtual service center). The customer 304 may also have previously provided authentication information when logging in to a network subscriber profile or account in the MNO website or user application 310. A system or platform providing the virtual service center 302 can use and leverage the authentication information if previously provided in the MNO website or user application 310 used to initiate access. The authentication information can be used to pre-load and/or personalize virtual content within the virtual service center. For example, a customer's previous log-in is used to load personal information such as the customer's name to welcome the customer into the virtual service center 302, to determine current network devices associated with the customer 304, to retrieve information related to previous visits by the customer 304 to the virtual service center 302 and/or real-world service centers associated with the MNO, and/or the like. The system generating and/or providing the virtual world obtains the authentication information associated with a network subscriber from the MNO website or user application. In some embodiments, the authentication information may be passed via a token (e.g., an OAuth token) from the MNO website or user application 310 to a server system or platform generating, hosting, providing, and/or maintaining the virtual world.

When directly accessing the virtual world via an immersive user device 308 and without an intervening access means through an MNO website or user application 310, a server system or platform may first prompt a customer 304 with authentication information prior to the customer 304 virtually entering the virtual service center 302. In some examples, the virtual service center 302 is accessible by a user only if the user is a network subscriber with the MNO. The system can permit or deny access to the virtual service center 302 based on whether the user provides authentication information associated with a network subscriber with the MNO.

Figure 4A:
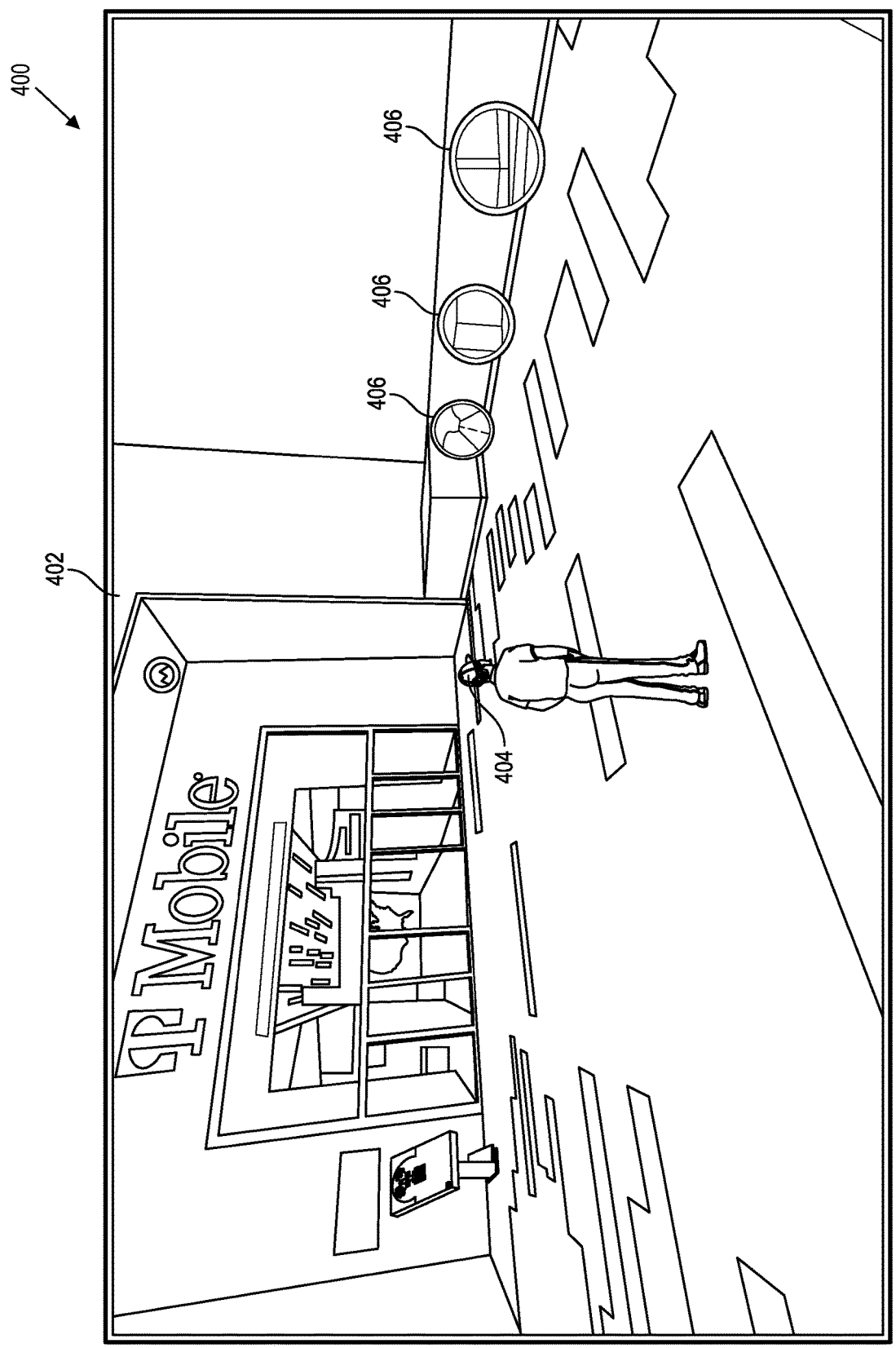
FIGS. 4A-4F illustrate example views of a virtual environment (e.g., a VR world) comprising a virtual service center with improved immersion according to example embodiments disclosed herein.
Figure 4B:
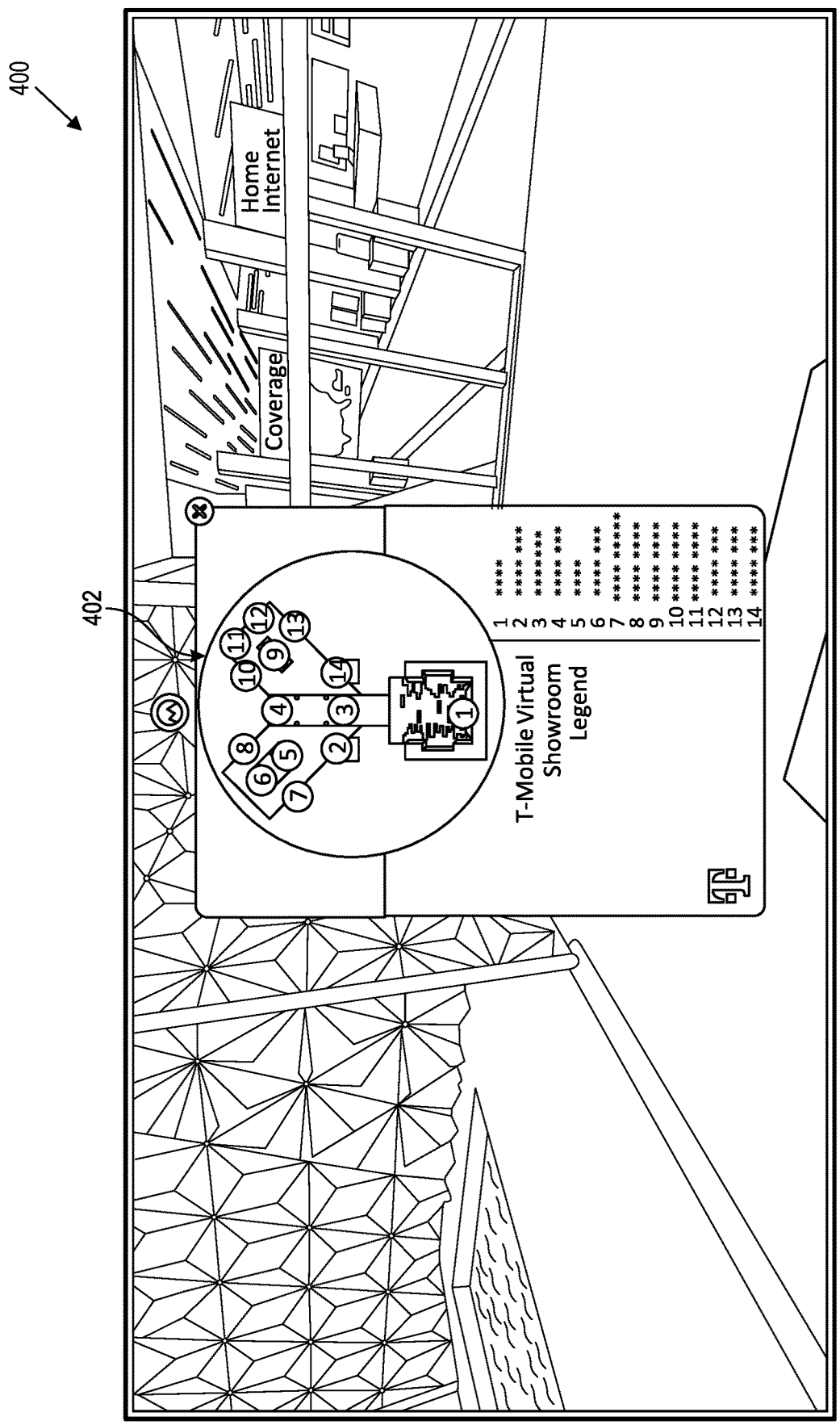

FIGS. 4A-4E illustrate example views of a virtual world 400 and a virtual service center 402 provided within the virtual world 400. The virtual service center 402 exists within a virtual world 400, and a user operating a virtual avatar 404 within the virtual world can enter into the virtual service center 402, as illustrated in FIG. 4A. FIG. 4B shows a map demonstrating the virtual service center 402 occupying a space within the virtual world 400. In some embodiments, the size of the virtual service center 402 can be scaled according to a number of users requesting access into the virtual service center 402 and currently located within the virtual service center 402. For example, when users initiate access into the virtual world 400 via the MNO user application or website, the MNO can monitor, via the MNO user application and website, at least a number of users accessing the virtual service center and control a size of the virtual service center 402 accordingly.

The user operates a virtual avatar 404 to navigate and traverse the virtual world 400, including the virtual service center 402. The user can configure characteristics and attributes of the virtual avatar 404, such as physical features and appearances, which can be perceived by other users within the virtual world 400 and virtual service center 402. In some embodiments, the characteristics and attributes of the virtual avatar 404 is recorded with network subscriber information, and the virtual avatar 404 of the user can be configured using the authentication information to retrieve the characteristics and attributes. In some embodiments, the virtual avatar 404 can be configured using the authentication information when the user first accesses the virtual world 400, or when the user first enters the virtual service center 402.

Figure 4C:
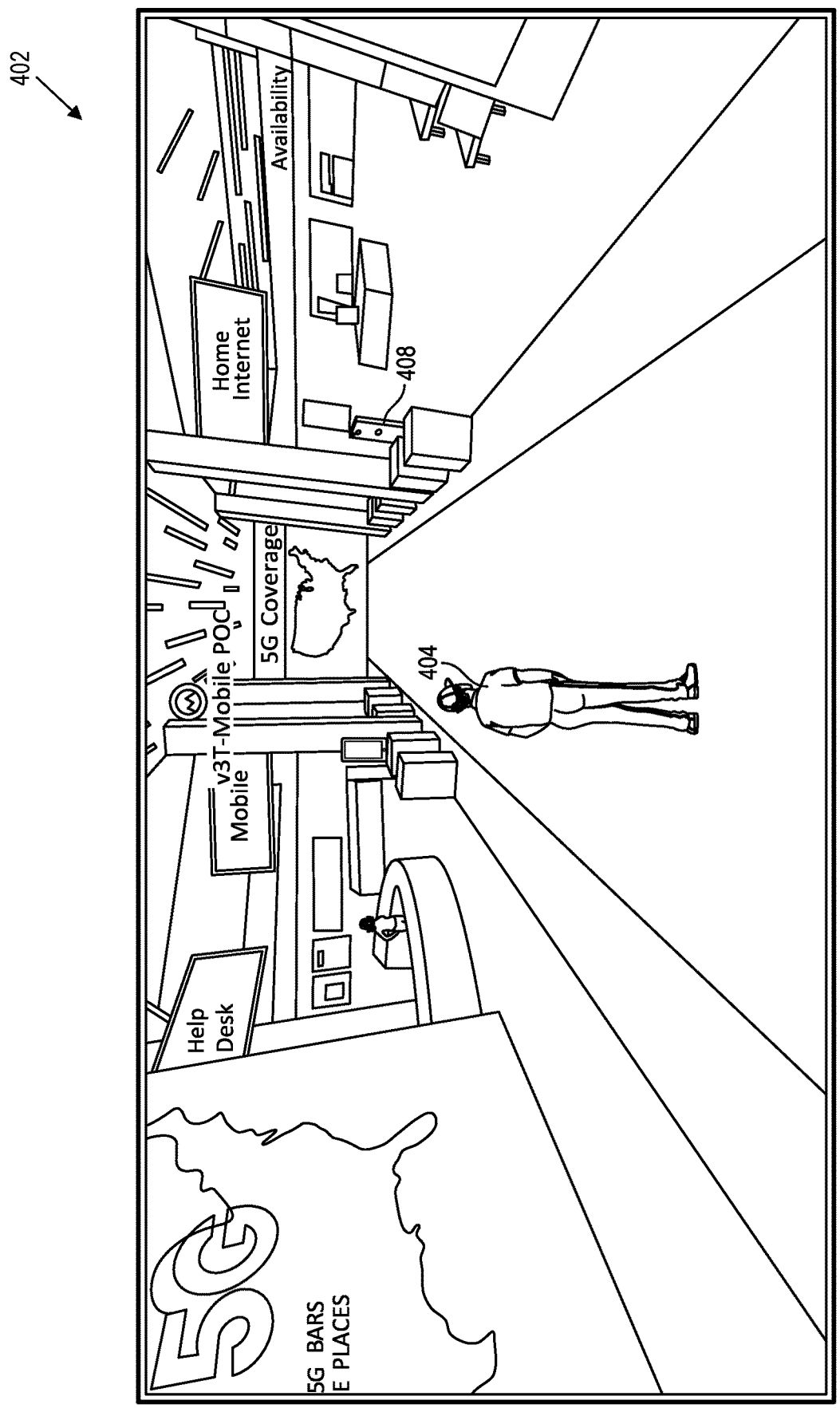
Figure 4D:
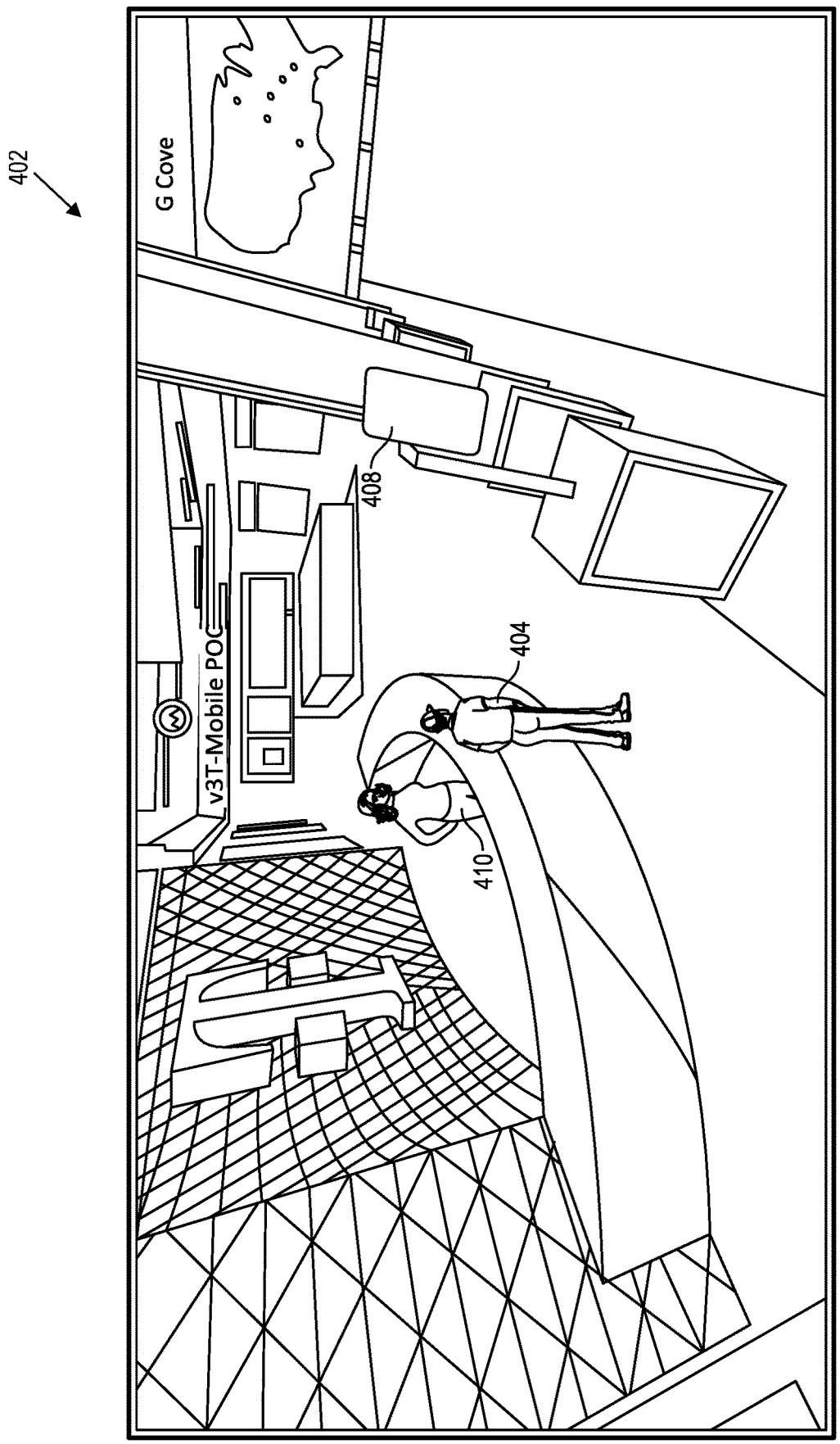
Figure 4E:
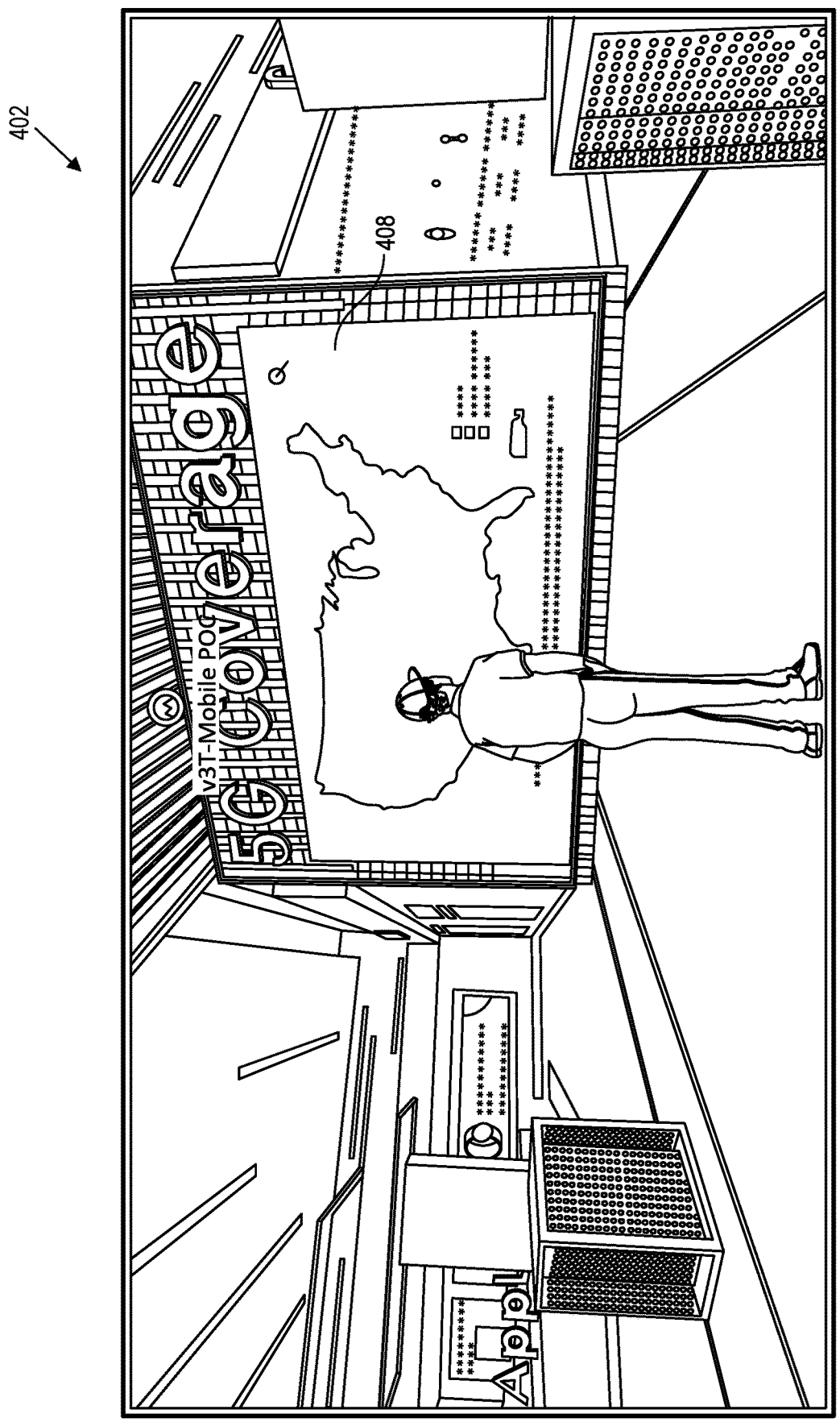
Figure 4F:
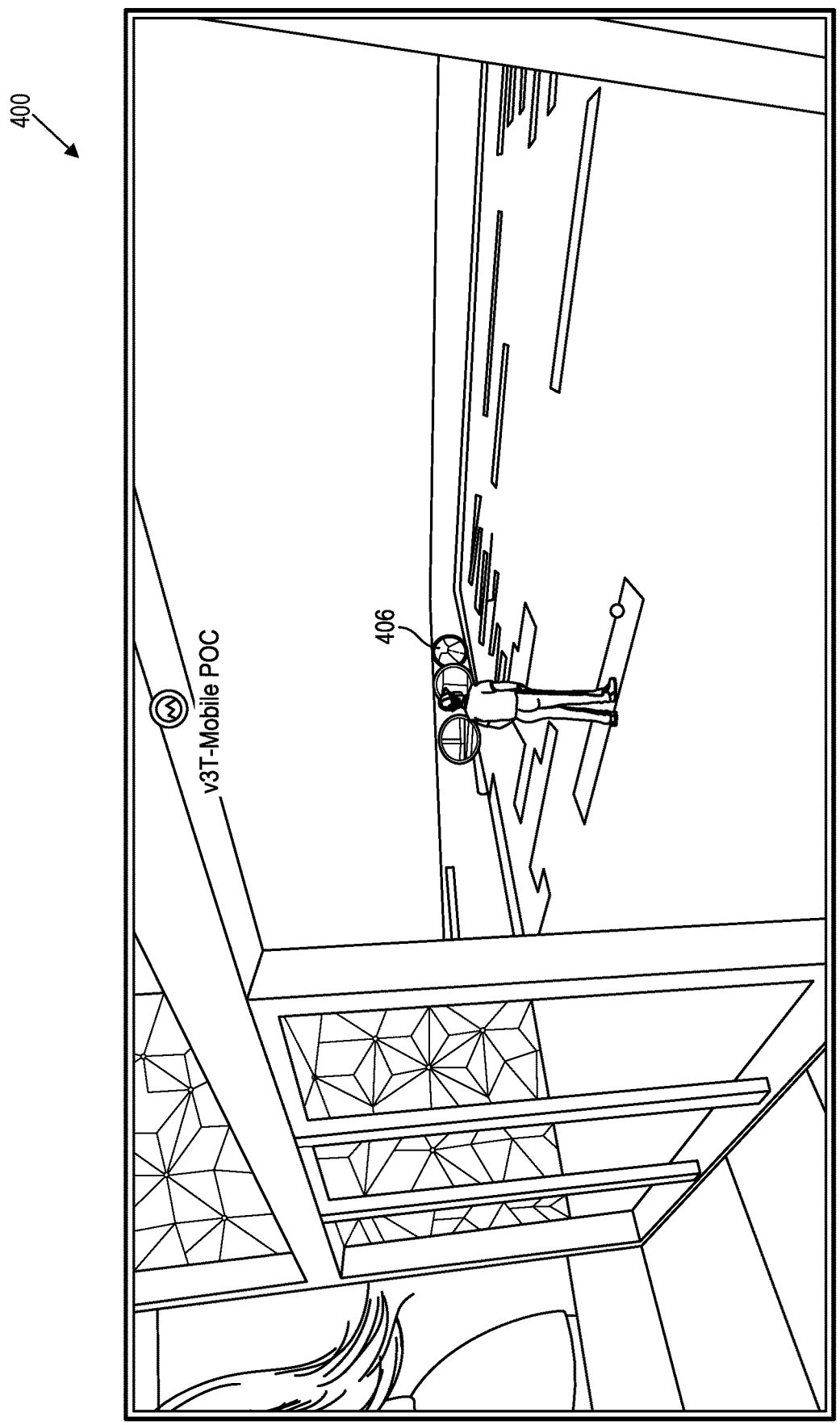

FIGS. 4A and 4F illustrates virtual transportation 406, specifically implemented as portals in the illustrated embodiment, which are configured to transport a user (or a virtual avatar 404) to a different location or experience within the virtual world 400, such as an alternative virtual experience selected for the user. In response an interaction between the user (or a virtual avatar 404) and a virtual transportation 406, the user can be transported to or provided with the different location or experience. In some examples, the virtual transportation 406 causes a virtual experience to be provided to the user without transporting the user to a different location within the virtual world 400. For example, content such as a movie can begin playing for the user while the virtual avatar 404 remains in place, in response to an interaction with the virtual transportation 406. Alternative to a portal, virtual transportation 406 can include virtual transportation means such as a virtual vehicle (e.g., a car), and the user can be transported to or provided with a different experience instantaneously after the interaction or after some delay from the interaction.

As shown in FIGS. 4C, 4D, and 4E, the virtual service center 402 includes virtual objects 408 available for interaction by the user (or virtual avatar 404). In the illustrated examples, the virtual objects 408 include simulations of network devices (e.g., mobile phones) available for purchase and use with the telecommunications network associated with the MNO. Via at least these virtual objects 408, the user can evaluate different network devices for purchase and interact with the virtual objects 408 to obtain additional information (e.g., technical specifications) for the different network devices. Another example of a virtual object 408 in the virtual service center 402 is a geographic map that illustrates coverage for the telecommunications network. The user can interact with the geographic map to enlarge a view of the map, to specify a specific location, such as a home address, and/or the like to obtain detailed information related to the telecommunications network. In some examples, a number and/or size of a virtual object 408 can be scaled according to a number of users accessing and/or presently located within the virtual service center 402, similar to scaling the size of the virtual service center 402. That is, a number of instances of a virtual object can be scaled based at least on a number of users concurrently accessing the virtual service center. In doing so, users can more easily interact with an enlarged virtual object 408 when the virtual object 408 is crowded by other users (or virtual avatars 404).

In some embodiments, the virtual service center 402 includes a virtual assistant 410, as shown in FIG. 4D. The virtual assistant 410 is configured to facilitate the user's experience within the virtual service center 402, for example, and assist in resolving or fulfilling a service issue indicated by the user. In some embodiments, the virtual assistant 410 is an avatar operated or controlled by another user, such as a support or service user associated with the MNO. In some examples, this other user can, via the virtual assistant 410, verbally communicate with the user based on being in proximity to the user's virtual avatar 404, based on an interaction between virtual assistant 410 and the virtual avatar 404, and/or the like. Alternative to verbal communication, other forms of communication can be facilitated within the virtual service center 402, such as visual communication (e.g., displayed text and/or visuals, gestures, movements, sign language), haptic indications, and/or the like. With the virtual assistant 410, the user can enjoy a more immersive experience in communicating with the support or service user, at least compared to a telephone call. As such, the virtual assistant 410 is configured to represent an MNO user as the MNO user communicates instructions to the user for resolving the user's particular service issue (e.g., in a verbal or auditory form, in a visual form including gestures, movements, and sign language).

In some embodiments, the virtual assistant 410 is autonomously controlled; for example, the virtual assistant 410 is an autonomous bot, non-player character (NPC), and/or the like. In such implementations, the virtual assistant 410 is configured to determine the service issue indicated by the user, retrieve information related to the resolution or fulfillment of the service issue, and indicate the information to the user. For example, the virtual assistant 410 is trained to retrieve and indicate instructions for resolving a particular service issue to the user. In some examples, the virtual assistant 410 is trained to intelligently generate the instructions for resolving a service issue, for example, based on datasets describing various service issues and potential resolutions. In some embodiments, the virtual assistant 410 is implemented using a conversational agent or model trained to provide conversational responses.

Figure 5A:
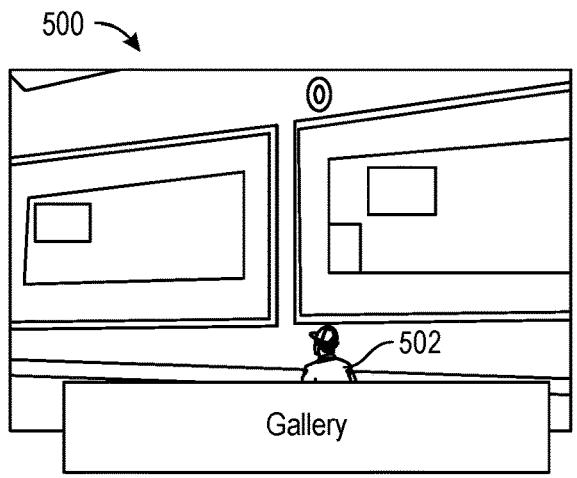
FIGS. 5A-5C illustrates examples of alternative virtual experiences selected for a network subscriber or user for improved immersion with a virtual service center.
Figure 5B:
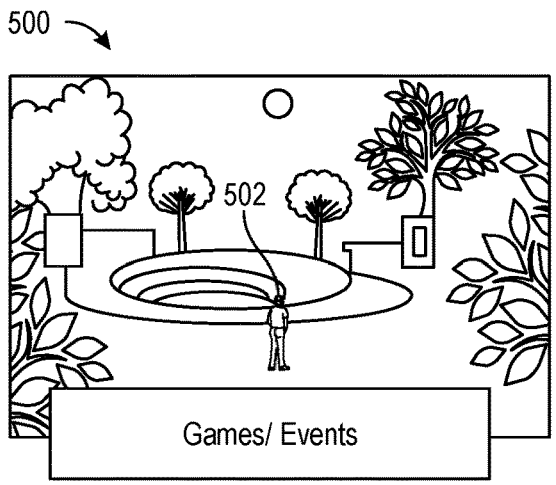
Figure 5C:
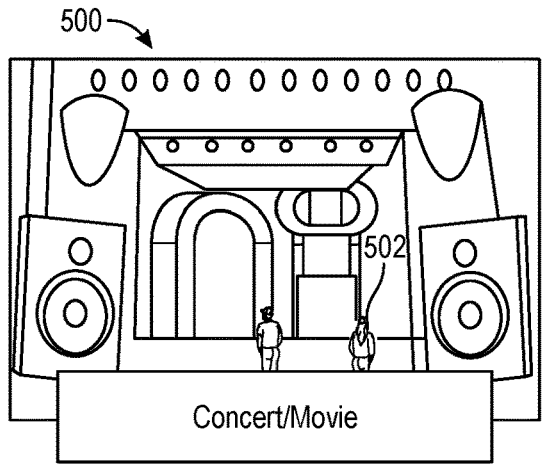

FIGS. 5A-5C illustrate examples of alternative virtual experiences. As referred to herein, alternative virtual experiences are experiences separate from the virtual service center, at least with respect to the virtual service center's purpose of resolving or fulfilling service issues. As such, users can be directed to alternative virtual experiences when the users are not actively engaged in resolving or fulfilling a service issue, such as when resolution or fulfillment is delayed or takes a length of time to complete. Alternative virtual experiences can also be enjoyed prior to and/or after resolving a service issue. In some instances, alternative virtual experiences are provided via the virtual service center according to the embodiments disclosed herein, for example, to motivate users to visit the virtual service center within the virtual world despite not having a service issue to be resolved or fulfilled. For example, certain alternative virtual experiences can be related to the MNO associated with the virtual service center, and the MNO provides these certain alternative virtual experiences via the virtual service center for the purpose of increasing user traffic through the virtual service center.

Examples of alternative virtual experiences include interactive experiences such as games, spectator experiences such as a movie or a musical concert, tourism-like experiences such as an art gallery or a simulated tour, and/or the like. Certain alternative virtual experiences that are particularly tied to an MNO can include a video stream of a live concert or a sporting event happening at a venue associated with the MNO (e.g., a stadium named for the MNO). Some examples of alternative virtual experiences are third-party virtual reality experiences provided within the same virtual world as the virtual service center, and for example, the user's virtual avatar 502 is then present within in the alternative virtual experience 500. In some examples, an alternative virtual experience is content provided within or near the virtual service center, such as a video stream or movie, which can be consumed by the user via the user's perception of the virtual world.

Figure 6:
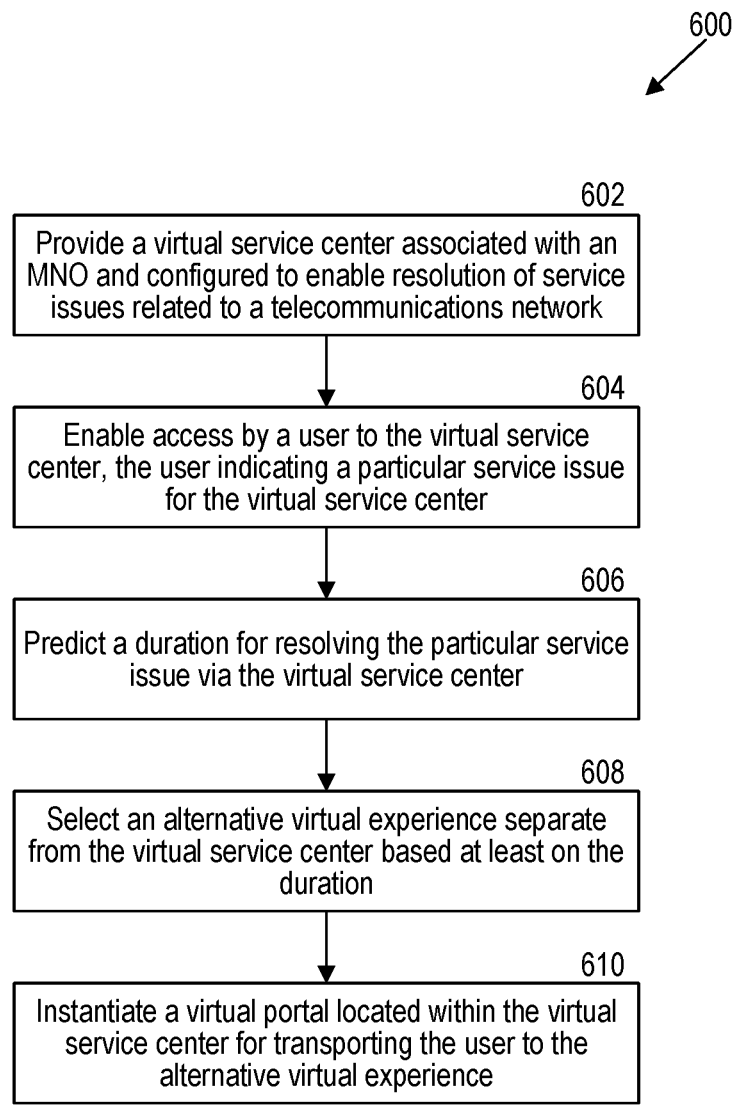
FIG. 6 is a flowchart that illustrates example operations for providing a virtual service center with improved immersion.

FIG. 6 is a flowchart of an example method 600 for providing a virtual service center in a virtual world for resolving service issues related to a telecommunications network. The example method 600 implements example embodiments disclosed herein for improving continuous and non-episodic visits by users to the virtual service center. In some embodiments, the example method 600 is implemented and/or performed by a system or platform hosting a virtual world or environment. The system or platform can generate the virtual world or environment and can serve real-time rendering data, positioning data, orientation data, content data, and/or the like to client devices where users can experience the virtual world or environment. In doing so, the system or platform can implement and/or perform the example method 600 to improve the users' immersion in the virtual world in relation to a virtual service center associated with an MNO of a telecommunications network.

At 602, the system provides a virtual service center associated with the MNO and configured to enable resolution or fulfillment of service issues related to a telecommunications network. In some embodiments, the virtual service center is configured to enable resolution or fulfillment of service issues based on comprising a virtual assistant with which users located within the virtual service center can interact. In some examples, the service issues that the virtual service center can address include purchase and/or provisioning of a new network devices (e.g., a mobile phone) with the telecommunications network operated by the MNO. In some embodiments, the virtual service center is a persistent construct, feature, or space within a virtual world that is maintained by the system. In some embodiments, the virtual service center is generated, rendered, and/or provided in response to a user requesting access to the virtual service center. In doing so, computing resources are employed in an optimized manner, and specifically, are conserved if no users are presently visiting the virtual service center. In some embodiments, the virtual service center is configured for shared and multi-user experiences, where multiple users can simultaneously enter the virtual service center and interact with one another.

At 604, the system enables access by a user to the virtual service center, in response to a request by the user. In some examples, the user requests access to the virtual service center on the basis of a particular service issue. For example, the user visits the virtual service center to purchase and/or provision a new network device. In some examples, the user is a network subscriber of the MNO, and access by the user is enabled based on the system verifying that the user is or is associated with the network subscriber of the MNO using authentication information obtained for the user. In some embodiments, the request by the user can originate from an MNO website or user application from which the authentication information associated with a network subscriber is provided to the system. In some embodiments, the user can access the virtual service center using an immersive user device or a non-immersive user device.

At 606, the system predicts a duration for resolving the particular service issue for the user via the virtual service center. In some embodiments, the particular service issue is indicated by the user, for example, in response to a query presented to the user when the user enters the virtual service center. In some embodiments, the system determines the particular service issue based on the activity or behavior of the user inside the virtual service center. For example, the system determines that the user intends to purchase and/or provision a new network device based on the user interacting with a virtual object simulating the new network device inside the virtual service center. The system can then predict a duration for resolving the particular service issue based on determining or identifying the particular service issue.

In some embodiments, the system predicts the duration for resolving the particular service issue based on historical data indicating durations for resolving the particular service issue in previous instances (e.g., an average duration, a maximum duration, a minimum duration). Service issues of different complexities can be associated with different durations. For example, purchase and provisioning a new network device can be associated with a longer duration compared to a troubleshooting of a network device configuration or setting (which may be resolved simply by providing instructions, a manual, a technical guide, or the like to the user). In some embodiments, the system can additionally or alternatively predict the duration based on a present state of the virtual service center, for example, including a number of other users visiting the virtual service center, a ratio between users and virtual assistants, and/or the like. In some instances, the resolution or fulfillment of a service issue can relate to a current state of the telecommunications network or systems relating to the configuration and management of the telecommunications network. For instance, provisioning a new network device can involve a provisioning process that involves the telecommunications network or systems related thereto to activate a subscriber identify module (SIM) for the new network device and to enable the telecommunications network to recognize the new network device. Thus, the prediction of a duration can be further based on current states, loads, and configurations of the telecommunications network and other systems such as a subscriber management system for the telecommunications network.

In some embodiments, the system implements a machine learning (ML) model, a predictive model, an optimization model, and/or the like to generate a prediction of the duration for resolving or fulfilling the particular service issue. The factors discussed above upon which a predicted duration may be based can be provided as inputs to a model, and the model is configured and/or trained to provide an output with the predicted duration.

At 608, the system selects an alternative virtual experience for the user. The system can select the alternative virtual experience based on the predicted duration being longer than a threshold (suggesting a long time or delay needed to resolve the particular service issue), to thereby retain the user's attention and immersion in the virtual service center or virtual world. In some embodiments, the system selects the alternative virtual experience in response to the user entering the virtual service center, such that the alternative virtual experience can be offered to the user before the user begins engagement on the service issue and/or if the user does not have a particular service issue to be resolved or fulfilled at the virtual service center. In some embodiments, the system selects the alternative virtual experience subsequent to the particular service issue being resolved or fulfilled, to thus encourage the user to remain in the virtual service center or the virtual center with the alternative virtual experience.

The system can select an alternative virtual experience based on the alternative virtual experience being expected to last the predicted duration. For example, the alternative virtual experience is a movie, a video stream, a spectator event, and/or the like that has a length greater than or equal to the predicted duration. As such, the user's attention throughout the predicted duration can be occupied by the alternative virtual experience. In some embodiments, the system can select a plurality of alternative virtual experiences to cumulatively span the predicted duration. Alternative virtual experiences can be associated with respective durations, which the system can compare to the predicted duration for resolving or fulfilling the particular service issue. For example, a movie can have a specified runtime. As another example, a virtual electronic game can be associated with an average playtime, minimum playtime, maximum playtime, and/or the like based on play by previous users.

In some embodiments, the system can further (or alternatively) select the alternative virtual experience based on preferences associated with the user. If the user is a network subscriber with network subscriber information being stored and managed by the MNO, the system can leverage the network subscriber information, including historical behavior in the virtual world and/or a real world, to select alternative virtual experiences predicted or expected to be of interest to the user specifically. In some embodiments, the system implements a recommendation engine, a machine learning model, a predictive model, and/or the like for selecting an alternative virtual experience based on preferences associated with the user. For example, a machine learning model implemented by the system is trained based on historical selections of alternative experiences for historical users with certain preferences, and based on this training, the machine learning model can provide an output indicating (e.g., weighing) alternative virtual experiences recommended for the user. As an example, historical activity of the user in the virtual world can suggest that the user prefers interactive games over movie watching, and using the historical activity, a model implemented by the system can provide an output causing the system to select an alternative virtual experience that is a game or mini-game in the virtual world (such as a game that the user has previously played).

At 610, the system instantiates a virtual portal within the virtual service center for transporting the user to the alternative virtual experience (or for providing the alternative virtual experience to the user). The virtual portal is configured to trigger the alternative virtual experience to the user, whether by transporting or re-locating the user's virtual avatar in the virtual world to a virtual location where the alternative virtual experience is provided, by playing, rendering, or generating content related to the alternative virtual experience (e.g., in a pop-up window), and/or the like. In some embodiments, multiple alternative virtual experiences are selected and provided via virtual portals so that the user is able to choose an alternative virtual experience to enjoy. The virtual portal can be a virtual object that is interactable by users. Upon a user interacting with a virtual portal and being transported to an alternative virtual experience, the user's service issue can be continued to be fulfilled at the virtual service center, and the alternative virtual experience causes the user to avoid idly waiting for the service issue to be fulfilled. In some embodiments, the system can cause the user to be transported back to the virtual service center in response to the particular service issue being resolved, in response to user input or selection being required to resolve the particular service issue, and/or the like. In some examples, the system can persistently display a status indicator, a countdown clock, and/or the like for the particular service issue while the user is consuming the alternative virtual experience.

Computer System

Figure 7:
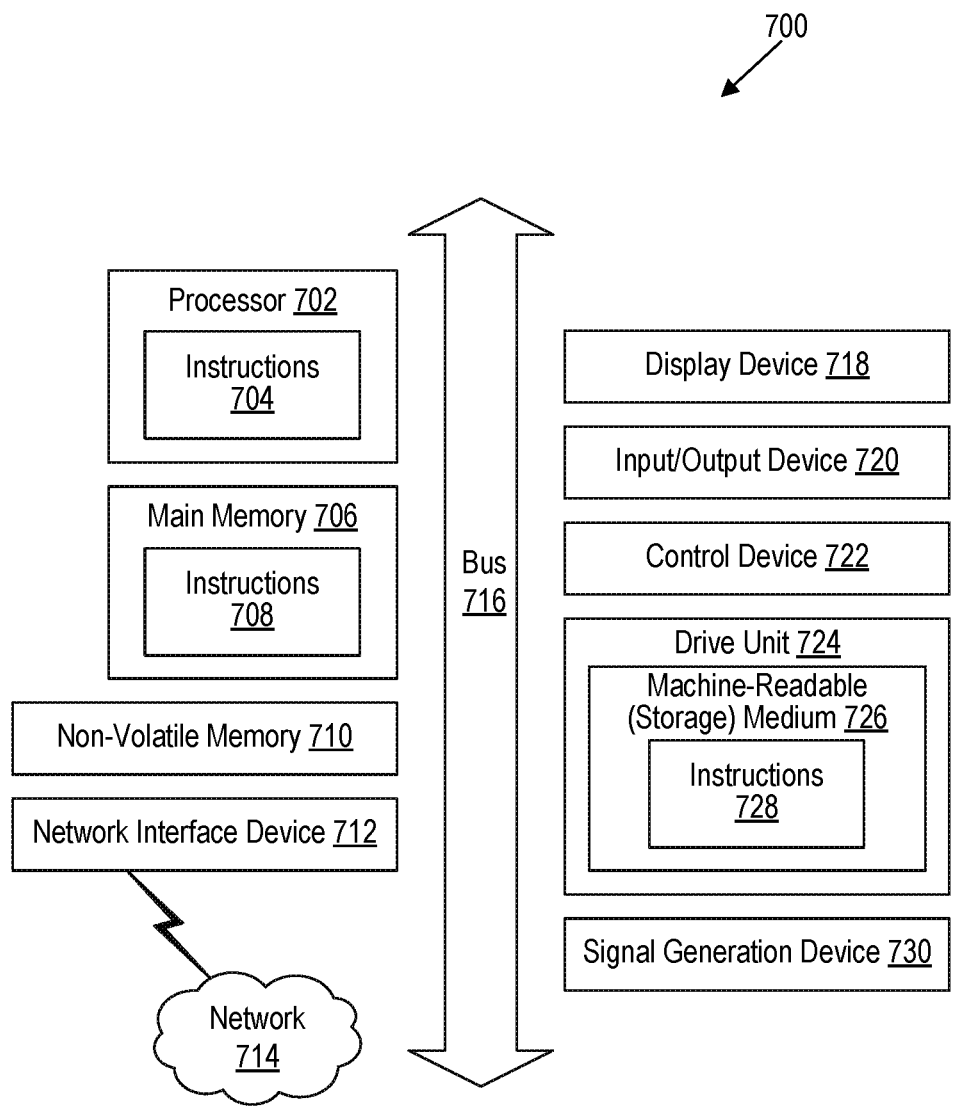
FIG. 7 is a block diagram that illustrates an example of a computing system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a systemon-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method for improving immersion of an extended reality (XR) system, the method comprising:
    in response to a request by a client user, generating, by a server, a virtual service center within a virtual world provided by the server, the virtual service center being associated with an MNO of a telecommunications network and configured to enable resolution of service issues related to the telecommunications network,
        wherein the client user provides authentication information for a network subscriber profile associated with the MNO of the telecommunications network and indicates a particular service issue to be resolved via the virtual service center;
    predicting, by the server, a duration for resolving the particular service issue;
    selecting, by the server, an alternative virtual experience within the virtual world based on the alternative virtual experience being configured to run at least the duration predicted for resolving the particular service issue; and
    instantiating, by the server, a virtual object within the virtual world that is configured to trigger the alternative virtual experience for the client user for the duration prior to the particular service issue being resolved.

2. The method of claim 1, wherein the particular service issue indicated by the client user comprises a provisioning of a new network device for the telecommunications network, and wherein the duration is predicted further based on a duration of a provisioning process performed with the telecommunications network.

3. The method of claim 2, further comprising:
    generating, within the virtual service center, a plurality of virtual objects that represent network devices available for provisioning with the telecommunications network the new network device, wherein the provisioning of the new network device is indicated by the client user via a virtual interaction with one of the plurality of virtual objects.

4. The method of claim 3, further comprising:
    scaling a number of instances of each of the plurality of virtual objects based on a number of network subscribers concurrently accessing the virtual service center.

5. The method of claim 1, wherein the alternative virtual experience is selected further based on historical activity of the client user within the virtual world indicated by the network subscriber profile.

6. The method of claim 1, wherein the alternative virtual experience comprises one of an electronic game, a movie, a musical concert, or a virtual gallery.

7. A non-transitory, computer-readable storage medium comprising instructions recorded thereon, wherein the instructions when executed by at least one data processor of a system, cause the system to:
    generate a virtual reality (VR) environment comprising a virtual service center associated with a mobile network operator (MNO) of a telecommunications network, the virtual service center comprising a virtual assistant or avatar configured to enable resolution of service issues related to the telecommunications network;
    in response to a request by a network subscriber of the MNO, enable access to the virtual service center for the network subscriber in accordance with authentication information associated with the network subscriber;
    for a particular service issue indicated by the network subscriber, predict a duration for resolving the particular service issue via the virtual service center based on respective service issues indicated by other network subscribers accessing the virtual service center;
    select, for the network subscriber, an alternative virtual experience that is located separate from the virtual service center and within the VR environment, wherein the alternative virtual experience is selected at least based on a set of subscriber preferences stored in connection with the authentication information associated with the network subscriber, and further based on the alternative virtual experience being expected to last at least the duration predicted for the particular service issue to be resolved; and
    instantiate a virtual portal located within the virtual service center, wherein the virtual portal is configured to trigger the alternative virtual experience for the network subscriber.

8. The non-transitory, computer-readable storage medium of claim 7, wherein the virtual portal is configured to trigger the alternative virtual experience based on virtually transporting the network subscriber within the VR environment to the alternative virtual experience that is located separate from the virtual service center.

9. The non-transitory, computer-readable storage medium of claim 7, wherein the virtual assistant or avatar is configured to represent an MNO user as the MNO user communicates verbal instructions to the network subscriber for resolving the particular service issue.

10. The non-transitory, computer-readable storage medium of claim 7, wherein the virtual assistant or avatar is an autonomous bot that is trained to retrieve and indicate instructions for resolving the particular service issue to the network subscriber.

11. The non-transitory, computer-readable storage medium of claim 7, wherein the particular service issue indicated by the network subscriber comprises a provisioning of a new network device for the telecommunications network, and wherein the duration is predicted further based on a duration of a provisioning process performed with the telecommunications network.

12. The non-transitory, computer-readable storage medium of claim 11, wherein the instructions further cause the system to:

generate, within the virtual service center, a plurality of virtual objects that represent network devices available for provisioning with the telecommunications network the new network device, wherein the provisioning of the new network device is indicated by the network subscriber via a virtual interaction with one of the plurality of virtual objects.

13. The non-transitory, computer-readable storage medium of claim 12, wherein the instructions further cause the system to:

scale a number of instances of each of the plurality of virtual objects based on a number of network subscribers concurrently accessing the virtual service center.

14. The non-transitory, computer-readable storage medium of claim 7, wherein the instructions further cause the system to:

obtain the authentication information associated with the network subscriber from a MNO user application residing on a user device operated by the network subscriber, the request to access the virtual service center originating from the MNO user application.

15. The non-transitory, computer-readable storage medium of claim 7, wherein the alternative virtual experience comprises one of an electronic game provided within the VR environment, a movie, a musical concert, or a virtual gallery.

16. The non-transitory, computer-readable storage medium of claim 7, wherein the instructions further cause the system to:

cause the network subscriber to be transported back to the virtual service center in response to the particular service issue being resolved.

17. A system comprising:

at least one hardware processor; and at least one non-transitory memory storing instructions, which, when executed by the at least one hardware processor, cause the system to:

provide a virtual service center within a VR environment, the virtual service center being associated with an MNO of a telecommunications network and comprising a virtual assistant or avatar configured to enable resolution of service issues related to the telecommunications network;

enable access to the virtual service center for a client user based on the client user indicating a request to provision a new network device for the telecommunications network;

predict a duration for provisioning the new network device for the telecommunications network based on respective service issues being resolved for other network subscribers accessing the virtual service center and a duration for a provisioning process performed with the telecommunications network;

select an alternative virtual experience within the VR environment that is expected to run at least the duration predicted for provisioning the new network device; and instantiate a virtual portal located within the virtual service center, wherein the virtual portal is configured to trigger the alternative virtual experience for the client user.

18. The system of claim 17, wherein the virtual assistant or avatar is configured to represent an MNO user concurrently accessing the virtual service center to facilitate the provisioning of the new network device.

19. The system of claim 17, wherein the client user is a network subscriber associated with the MNO, and wherein the access to the virtual service center for the client user is further enabled based on the client user providing authentication information.

20. The system of claim 19, wherein the instructions further cause the system to:

obtain the authentication information for enabling access to the virtual service center based on the client user initiating access to the virtual service center via an MNO website where the client user has previously used authentication information.

* * * * *